US009422057B2

United States Patent
Koschberg et al.

(10) Patent No.: US 9,422,057 B2
(45) Date of Patent: Aug. 23, 2016

(54) GALLEY APPLIANCE CONTROLLER FOR AN AIRCRAFT

(75) Inventors: Stefan Koschberg, Ostseebad Nienhagen (DE); Ralph Schnabel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1184 days.

(21) Appl. No.: 12/641,005

(22) Filed: Dec. 17, 2009

(65) Prior Publication Data
US 2010/0243800 A1 Sep. 30, 2010

Related U.S. Application Data

(60) Provisional application No. 61/203,155, filed on Dec. 19, 2008.

(30) Foreign Application Priority Data

Dec. 19, 2008 (DE) ........................ 10 2008 064 119

(51) Int. Cl.
*B64D 11/00* (2006.01)
*B64D 11/04* (2006.01)

(52) U.S. Cl.
CPC ..................... *B64D 11/04* (2013.01)

(58) Field of Classification Search
CPC ...................................... B64D 11/04
USPC ................. 126/24; 244/118.5; 715/744, 741; 700/275; 307/9.1
See application file for complete search history.

(56) References Cited

U.S. PATENT DOCUMENTS

| | | | | |
|---|---|---|---|---|
| 3,641,410 A | * | 2/1972 | Vogelsberg | .................. 388/830 |
| 3,983,553 A | * | 9/1976 | Kesling | ........................... 341/27 |
| 4,247,845 A | * | 1/1981 | Schmidt et al. | ................. 341/35 |
| 4,275,464 A | * | 6/1981 | Schmidt | ............ G05B 19/0428 68/12.01 |
| 4,535,254 A | * | 8/1985 | Khatri | ............................ 307/38 |
| 4,703,306 A | * | 10/1987 | Barritt | ......................... 340/4.35 |
| 4,812,963 A | * | 3/1989 | Albrecht et al. | .................. 700/2 |
| 5,306,995 A | * | 4/1994 | Payne | .................. G05B 19/042 318/561 |
| 5,637,933 A | * | 6/1997 | Rawlings et al. | ............ 307/147 |
| 5,818,428 A | * | 10/1998 | Eisenbrandt | ....... G05B 19/0426 345/173 |
| 5,936,318 A | * | 8/1999 | Weiler et al. | .................... 307/66 |
| 6,664,656 B2 | * | 12/2003 | Bernier | ......................... 307/9.1 |
| 7,098,555 B2 | * | 8/2006 | Glahn et al. | .................... 307/32 |
| 7,098,772 B2 | * | 8/2006 | Cohen | ...................... 340/309.16 |
| D529,432 S | * | 10/2006 | Boren | ......................... D12/345 |

(Continued)

FOREIGN PATENT DOCUMENTS

EP 573827 A2 * 12/1993
WO WO 2005/094646 10/2005

(Continued)

*Primary Examiner* — Avinash Savani
*Assistant Examiner* — George R Blum
(74) *Attorney, Agent, or Firm* — Taft, Stettinius & Hollister LLP

(57) ABSTRACT

A galley (10) for an aircraft comprises a plurality of electrical kitchen appliances (24) that differ functionally from one another. Of these, at least a partial number of at least two electrical appliances comprise in each case an operator control unit (26), which is manufactured structurally separate from a main functional part of the relevant appliance and has an arrangement of operator control elements for operator control of the appliance. The operator control units are in this case designed to be of an identical construction to one another from appliance to appliance.

7 Claims, 4 Drawing Sheets

(56) References Cited

U.S. PATENT DOCUMENTS

Figure 1:
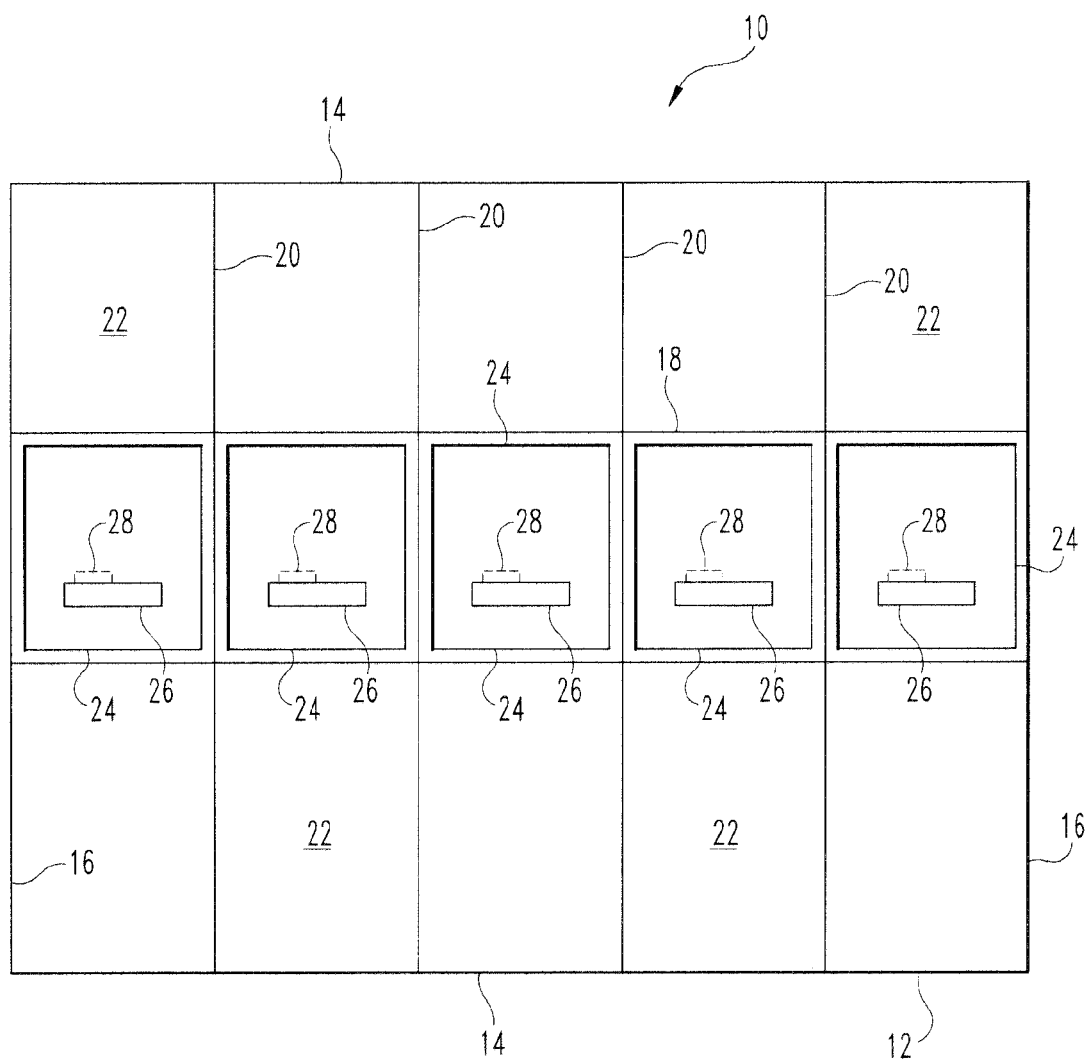

| | | | |
|---|---|---|---|
| 7,254,779 B1* | 8/2007 | Rezvani et al. | 715/745 |
| 7,420,292 B2* | 9/2008 | Busdiecker et al. | 307/11 |
| 7,565,903 B2* | 7/2009 | Sasaki et al. | 126/24 |
| 8,058,829 B2* | 11/2011 | Anderson | 318/432 |
| 8,120,894 B2* | 2/2012 | Zavidniak et al. | 361/624 |
| 8,140,190 B2* | 3/2012 | Ferragut, II | F25D 29/00 340/3.71 |
| 9,038,945 B2* | 5/2015 | Godecker | B64D 11/04 244/118.1 |
| 2001/0039190 A1* | 11/2001 | Bhatnagar | D06F 39/005 455/450 |
| 2004/0004635 A1* | 1/2004 | King | A47L 15/4293 715/741 |
| 2004/0057177 A1* | 3/2004 | Glahn et al. | 361/62 |
| 2005/0074231 A1* | 4/2005 | Suzuki et al. | 392/444 |
| 2005/0121978 A1* | 6/2005 | McAvoy | H02J 3/14 307/43 |
| 2006/0145002 A1* | 7/2006 | Van Loon | 244/118.1 |
| 2007/0228216 A1* | 10/2007 | Wenstrom | 244/118.5 |
| 2008/0001031 A1* | 1/2008 | Doebertin et al. | 244/118.1 |
| 2008/0116318 A1* | 5/2008 | Wesley | F16M 11/08 244/118.5 |
| 2009/0103221 A1* | 4/2009 | Aronson et al. | 361/93.2 |
| 2009/0314889 A1* | 12/2009 | Baatz et al. | 244/118.5 |
| 2010/0155391 A1* | 6/2010 | Koschberg et al. | 219/672 |
| 2010/0182136 A1* | 7/2010 | Pryor | G01F 23/292 340/425.5 |
| 2010/0243800 A1* | 9/2010 | Koschberg | B64D 11/04 244/118.5 |
| 2011/0101160 A1* | 5/2011 | Gomes et al. | 244/118.5 |
| 2011/0148664 A1* | 6/2011 | Shiomori | B64D 11/0015 340/945 |
| 2011/0238742 A1* | 9/2011 | Birkmann et al. | 709/203 |
| 2011/0266864 A1* | 11/2011 | McAvoy | 307/9.1 |
| 2012/0285335 A1* | 11/2012 | Cunningham et al. | 99/323.1 |
| 2013/0033789 A1* | 2/2013 | Aronson et al. | 361/87 |
| 2013/0248652 A1* | 9/2013 | Godecker | B64D 11/04 244/118.5 |

FOREIGN PATENT DOCUMENTS

| | | |
|---|---|---|
| WO | WO 2007/096000 | 8/2007 |
| WO | WO 2008/070835 | 6/2008 |

* cited by examiner

GALLEY APPLIANCE CONTROLLER FOR AN AIRCRAFT

CROSS REFERENCE TO RELATED APPLICATIONS

The present application claims priority to German Patent Application No. 10 2008 064 119.7, filed Dec. 19, 2008 and claims the benefit of U.S. Provisional Patent Application No. 61/203,155, filed Dec. 19, 2008, each of which is incorporated herein by reference.

The invention relates to a galley for an aircraft, wherein the galley possesses a plurality of electrical kitchen appliances that differ functionally from one another.

Galleys in aircraft, in particular passenger aircraft, are generally equipped with a plurality of electrical kitchen appliances, such as for example an oven, a coffee machine, a refrigerator, a toaster, a sandwich maker, a dishwasher and the like. It is self-evident that, depending on the aircraft and in particular depending on the passenger class (for example economy class, business class, first class), differing numbers of such kitchen appliances may be provided. Thus, for example a refrigerator or a toaster may be provided only in a first class galley. As a rule, however, it may be assumed that even in the lowest passenger category there will be at least two functionally different kitchen appliances in the galley. When the term functional difference of the kitchen appliances is used here, this refers to the catering function, i.e. for example brewing coffee, heating up food or washing dirty dishes.

An example of a typical galley is shown in WO 2007/096000 A1. Here, the galley has as a basic body a cabinet, which comprises a plurality of bays that are designed to be equipped with storage boxes, serving trolleys, electrical kitchen appliances and other insertable modules.

At present there is little discernible standardization among the manufacturers of electrical kitchen equipment for aircraft galleys. The appliance manufacturers do admittedly dimension their appliances in accordance with the specifications of the aircraft constructor so that they may be fitted exactly into the bays provided. They also comply with the specifications of the aircraft constructor with regard to specific operator control- and display functions that have to be enabled and/or supplied by the appliance. But with regard to the choice of the individual components of the appliances and in particular the design of the operator control side of the appliance they have extensive freedom of action. As a result, the user interface may be at times widely different from appliance to appliance and so an intuitive operator control of the appliances by the flight crew is scarcely possible. Instead, an induction course for each individual appliance is required. Even careful induction however cannot guarantee that in hectic situations inadvertent wrong operation will occasionally occur or it will take a while before the flight attendant finally discovers the correct function.

But it is not only in terms of user friendliness that the present situation with regard to the development and manufacture of kitchen appliances for aircraft galleys is unsatisfactory, but also in terms of the manufacturing costs. For individual developments always entail higher costs than solutions that use standardized components in the style of a modular system.

The object of the invention is accordingly to improve the user friendliness and the manufacturing costs of an aircraft galley having a plurality of electrical kitchen appliances that differ functionally from one another.

To achieve this object, according to the invention it is provided that in a galley of the described type at least a partial number of at least two of the electrical appliances have in each case an operator control unit, which is manufactured structurally separate from a main functional part of the relevant appliance and has an arrangement of operator control elements for operator control of the appliance, and that the operator control units of the appliances are at least partially, in particular completely identical in construction to one another. The use of identically constructed operator control units allows a modularization of the kitchen appliances and hence a use of standardized basic components. This has a cost-reducing effect. The operator control units may be supplied for example by a third-party supplier specified by the aircraft constructor in a completely identical form to the manufacturers of the kitchen appliances, who then connect them electrically and mechanically to the main functional part of the relevant appliance. Here, the term main functional part refers to the part of the appliance that supplies the desired catering function, i.e. for example the brewing of coffee or the heating of food. The main functional part may in particular also comprise a basic housing of the relevant appliance. The identical construction of the operator control units may moreover guarantee that the operator control interface is at least substantially uniform from appliance to appliance and that identical or corresponding operator control patterns initiate identical or corresponding functions of the appliances. This enhances user friendliness and hence also operator control reliability.

According to a preferred embodiment, the at least partially identical construction of the operator control units may include a mutually identical arrangement scheme of the operator control elements of the operator control units. This makes an intuitive operator control of the appliances particularly simple. In particular, the operator control elements of the operator control units may comprise in each case at least one operator control element, which is disposed identically from operator control unit to operator control unit and to which for each of the relevant appliances at least one identical operator control function is assigned. Such functionally corresponding operator control elements may comprise for example a switch for switching on and off the operating voltage supply of the appliance. Alternatively or additionally they may comprise a switch for starting and stopping an operating run of the kitchen appliance. It should be pointed out that at least a partial number of the operator control elements may be assigned only one function each. Equally, at least some of the operator control elements may, depending on the operating state or/and menu level of a multi-level operator control menu of the appliance, be assigned different functions. The operator control units may then comprise in each case at least one operator control element, which in some of the operating states or/and at some of the menu levels has a corresponding functionality from appliance to appliance, while being assigned a different function or different functions in some other operating states or/and at some other menu levels. Generally speaking, the operator control elements of the operator control units may comprise in each case at least one operator control element, which is disposed identically from operator control unit to operator control unit and to which for at least a partial number of the appliances in each case at least one different operator control function is assigned.

According to a further preferred embodiment, the operator control units each comprise at least one visual display organ, wherein the at least partially identical construction of the operator control units includes a mutually identical arrangement scheme of the display organs of the operator control units. The display organs may comprise for example one or more indicator lamps (for example LEDs) that light up in one or selectively in a plurality of different colours or/and an alphanumeric or graphic display section (for example a liquid-crystal display).

Alternatively or in addition to an identical shape and size and an identical design of an operator control side, the at least partially identical construction of the operator control units may include an identical construction of an electrical interface arrangement, by which the relevant operator control unit is connected electrically to the main functional part of the respective appliance. The electrical interface arrangement may be formed for example by an arrangement of electrical plug-in pins or sockets or by any other interface organs, by means of which the operator control unit may exchange electrical signals with the other electrical switching circuits of the relevant kitchen appliance. In this case, depending on the type of kitchen appliance and in particular depending on the number of operator control functions needed for the appliance, it is conceivable that a different number of the interface organs of the interface arrangement are used to transmit signals from and to the operator control unit, i.e. in other words, that at least in a partial number of the kitchen appliances some of the interface organs are unassigned.

The different nature of the operator control functions that are needed for various kitchen appliances may alternatively or additionally manifest itself in the fact that the operator control units comprise at least one operator control element that is disposed identically from operator control unit to operator control unit, these operator control elements however being assigned a function in only some of the appliances and having no function in the other appliances.

As far as the concrete design of the operator control elements is concerned, at least one of the operator control elements of each operator control unit may be a mechanical operator control element, for example in the form of a pushbutton, a tumbler switch or a rotary knob. Alternatively or additionally, at least one of the operator control elements of each operator control unit may be formed by a touch-sensitive button, such as are known for example from so-called touch pads or touch screens. These detect touching of the touch pad or touch screen by means of the finger of a user or by means of an input stylus on the basis of changes in capacitance or inductance or by means of pressure-sensitive elements. Input units having such touch-sensitive input sections are known as such to persons skilled in the art and are commercially obtainable.

Figure 2:
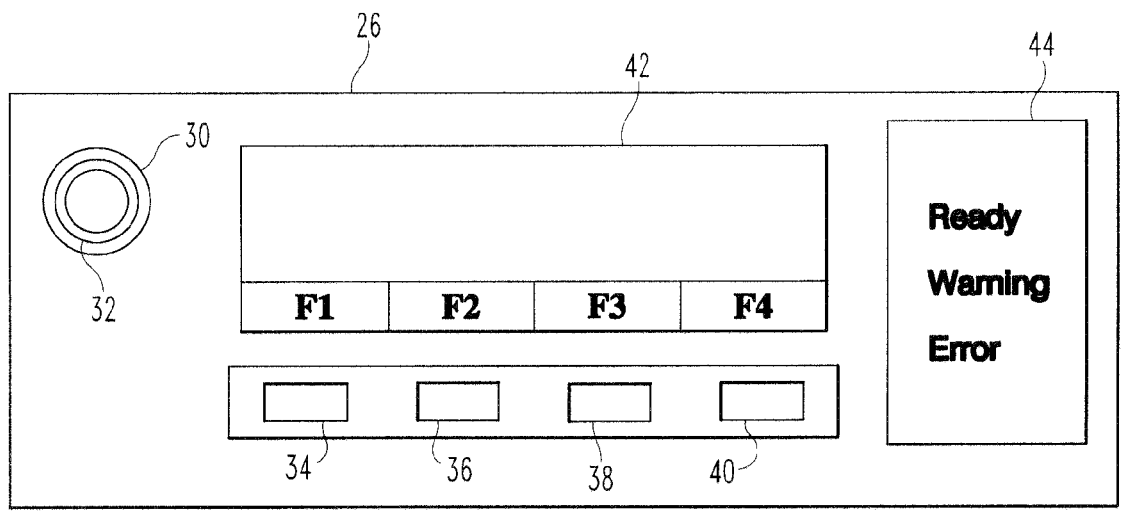
Figure 3:
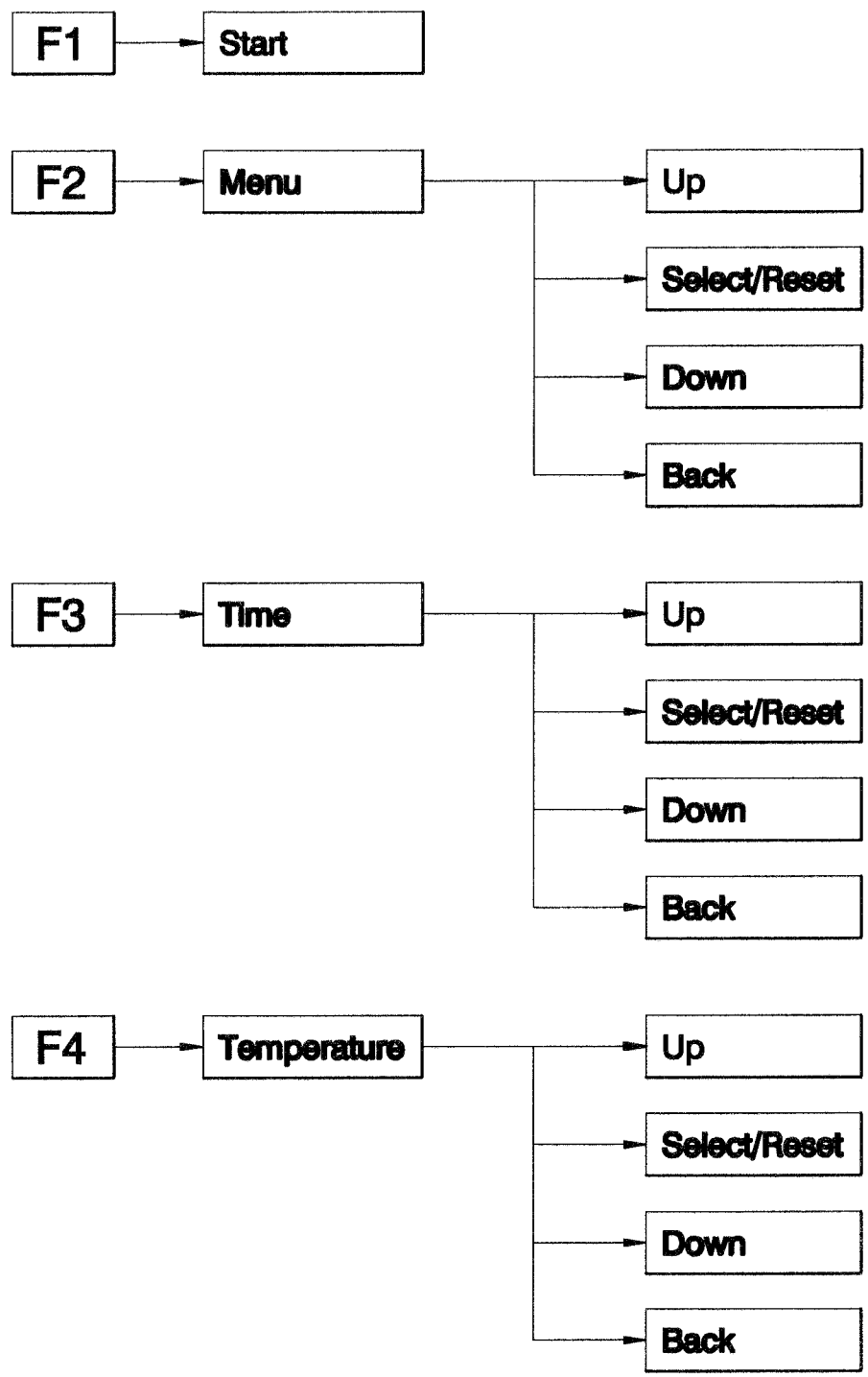
Figure 4:
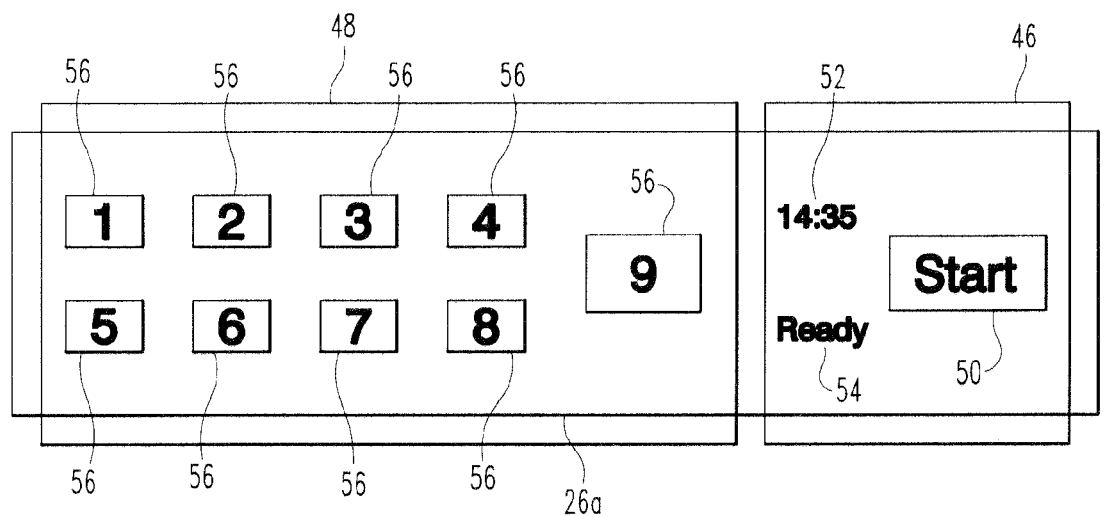

There now follows a detailed description of the invention with reference to the accompanying drawings. The drawings show:

FIG. 1 diagrammatically parts of an aircraft galley equipped with a plurality of electrical kitchen appliances, FIG. 2 an operator control unit for the kitchen appliances of FIG. 1 according to a first embodiment, FIG. 3 a menu tree for the operator control unit of FIG. 2 and FIG. 4 an operator control unit according to a further embodiment.

The galley—generally denoted by 10—that is represented diagrammatically in FIG. 1 comprises a basic cabinet 12, which is formed by a plurality of horizontal and vertical outer walls 14 and/or 16 as well as a plurality of horizontal and vertical partitions 18 and/or 20. The various walls of the cabinet delimit a plurality of bays 22, which are arranged here one above the other in a total of three levels and may be equipped with various components that are needed for the catering and serving operations of the aircraft. These components include, in addition to the electrical kitchen appliances dealt with in the context of the invention, for example storage boxes or so-called serving trolleys, i.e. rolling carts, on which the flight attendants bring food and drink to the passengers. In the illustrated example, only the middle level of bays 22 of the galley 10 is equipped with insertable components, namely in the concrete example with one electrical kitchen appliance 24 each. In this drawing all of the represented kitchen appliances 24 are identical; however at least a partial number of the kitchen appliances 24 differ from one another in terms of the catering function. In a concrete example, the kitchen appliances 24 comprise at least one coffee machine and at least one oven for heating up food. This corresponds to a basic set of equipment that is generally to be found even in the lowest category of passenger class. Further examples of kitchen appliances are a dishwasher, a sandwich maker and a refrigerator. Even though in the illustrated example all of the bays 22 of the middle level are occupied, it is self-evident that alternatively only some of these bays may be equipped with electrical appliances and the others may be either unoccupied or equipped with other components. It is moreover self-evident that the electrical kitchen appliances need not be accommodated all on one level and in particular need not necessarily be accommodated on the middle level of the bays but may be disposed on another level or distributed over a plurality of levels.

The kitchen appliances 24 have in each case an operator control unit 26, by means of which the flight crew of the aircraft may operate the respective appliance, i.e. control the operation thereof. In the illustrated example all of the operator control units 26 are situated so that their operator control side facing the operator is substantially at the same location in the respective appliance. This need not of course be the case. At least some of the operator control units 26 may be disposed in a different position on the front of the respective kitchen appliance 24.

The operator control units 26 are structurally separately manufactured modules, which for at least some of the kitchen appliances 24 and preferably for all of the kitchen appliances 24 are substantially completely identical in construction. In particular, the relative position and/or the arrangement scheme of the operator control- and display elements that are provided on the front (operator control side) is identical for all of the operator control units 26. As far as the visual appearance is concerned, there may be for example differences in colour or/and text, for example as a result of a different inscription on individual operator control elements. The operator control units 26 comprise in each case an electrical interface arrangement 28 that enables the electrical connection of the operator control units 26 to the other electrical switching circuits of the respective appliance. Because the interface arrangements 28 will be disposed as a rule at the back of the operator control units 26 and cannot be seen from the visible side of the galley 10, they are indicated by dashes in FIG. 1. The interface arrangements 28 may comprise for example a plurality of soldering tags or contact pins, which may be used to solder or otherwise fasten electrical connection wires of the appliance electrical system. Naturally, plug-in connections are also possible for connecting the operator control units 26 to the appliance electrical system of the kitchen appliances 24.

The operator control units 26 may be supplied for example by a third-party supplier specializing in the manufacture of such operator control units to the manufacturers of the kitchen appliances, who install them in their appliances. The assignment of operator control functions to the operator control units is then effected by the appliance manufacturer in dependence upon the particular nature of the respective appliance. Thus, a coffee machine may require different operator control functions than for example an electric oven. According to a preferred embodiment, however, at least some of the operator control functions are identical from appliance to appliance and are moreover assigned to the identical operator control element or the identical operator control elements. Thus, for example each of the operator control units 26 may comprise a first operator control element that is used to switch on and off an electric operating voltage supply of the relevant appliance. Alternatively or additionally, a second operator control element may be provided, which is used as a start- and/or stop key and allows an operating run of the relevant appliance to be started up and/or interrupted.

Because the kitchen appliances as a rule require at least partially different operator control functions, the operator control units 26 may moreover comprise one or more operator control elements that are functionally individualized in the sense that they are assigned at least partially different functions in different appliances. Thus, for example in an electric oven some of the operator control elements may allow regulation of the oven temperature, while the same operator control elements in a dishwasher either have no function or enable other functions. In a dishwasher there is generally no need for temperature regulation.

FIG. 2 shows a possible development of the operator control side of one of the operator control units 26. According to this example, the operator control unit 26 has an on/off switch 30 for switching the relevant appliance on and off. The switch 30 may be provided with an annular illuminated section 32, the illuminated state of which indicates to the user whether the appliance is switched on or off. The switched-off state may be a fully switched-off state, in which the kitchen appliance is no longer consuming any current at all, or it may be a standby state, in which, although the essential parts of the appliance electrical system are deactivated, some secondary functions, such as for example a time display, are still active, the overall result being that the appliance is still consuming a slight amount of current.

The operator control unit 26 according to FIG. 2 has as further operator control elements four function keys 34, 36, 38, 40, to each of which one or more functions may be assigned. In a display window 42, which is disposed above the function keys 34-40 and may be formed for example by a liquid-crystal display, the functions that may be activated by the function keys 34-40 in the respective operating state of the appliance are displayed. In this respect, function designations F1, F2, F3, F4 are shown in the representation of FIG. 2. To simplify operator control of the appliance, the function designations revealed in the display window 42 may be replaced by concrete function names, from which the personnel can tell at a glance the function that may be activated by the relevant function key. If the functions of the appliance that may be activated are accessible via a multi-level menu structure, i.e. are organized into a menu tree, it is conceivable for different function designations to be revealed for different menu levels. By way of explanation, reference is made in this regard to the example of a menu tree shown in FIG. 3. This menu tree defines a total of two menu levels and in the upper level assigns to the function keys 34-40 the functions and/or menu options: "start", "menu", "time" and "temperature". By pressing the function key 34 the "start" function is accordingly activated, which starts an operating run of the relevant kitchen appliance. Although it is not shown in FIG. 3, after pressing the function key 34 the associated function display in the display section 42 may change from "start" to "stop" to indicate to the user that by pressing the function key 34 once more the operating run may be stopped.

According to the menu tree of FIG. 3 the function key 38 is assigned the menu option "time", wherein pressing the function key 38 initially allows only a jump to the lower menu level, where then in association with the four function keys 34-40 the functions: "up", "select/reset", "down" and/or "back" are revealed. By activating the menu option "time" it is therefore possible to reach a menu level where a time setting (up, down, select/reset) is possible by pressing one of the function keys 34, 36, 38 and a return jump to the upper menu level is possible by pressing the function key 40 (back). The time setting may refer for example to the duration of a wash program of a dishwasher or to the heating period of an electric oven or a toaster.

In a similar manner, on the upper menu level by pressing the function key 40 ("temperature") it is possible to select a temperature setting menu that allows the same functions: "up", "select/reset", "down" and "back" as the time setting just described. In this way, the oven temperature for example may be set.

In the illustrated example of FIG. 3, on the upper menu level the function key 36 is not assigned a specific operating function. This is represented by the general function designation "menu". It is self-evident that, depending on the kitchen appliance, the key 36 may also be assigned a concrete menu function.

Besides the display window 42, the operator control unit 26 of FIG. 2 comprises a further display area 44, in which status indications of the operating status of the relevant kitchen appliance may be output. In the illustrated example, in the display area 44 either the status indication "ready" or a status indication "warning" or a status indication "error" may be output. These either indicate to the user that the appliance is ready to operate or warn of an unsafe or hazardous state or indicate that an error has occurred. These status indications are preferably identical for all of the operator control units of the galley, i.e. each kitchen appliance may output the same indications. If desired, the various text indications may be output in different colours.

FIG. 4 shows an alternative possible development of the operator control units of the galley 10 according to FIG. 1. As a way of distinguishing it from the embodiment according to FIG. 2, the operator control unit of FIG. 4 is denoted by 26a. Its operator control side may be subdivided into a fixed area 46 and a variable area 48, these being indicated in FIG. 4 by dotted lines. Situated in the fixed area 46 are the operator control- and display elements that are identical in all of the kitchen appliances of the galley, in particular have identical functions and the same display content. Disposed in the variable area 48, on the other hand, are the operator control- or/and display elements that may have an at least partially different function and/or display content from appliance to appliance.

In the concrete example of FIG. 4, in the fixed area 46 of the operator control side of the operator control unit 26 a start key 50 is situated, by means of which an operating run of the relevant appliance may be started and optionally stopped. There are further situated in the display area 46 a display section 52, which enables a time display, as well as a display section 54, in which an indication of the operating state of the relevant appliance is effected in text form. Possible status indications may be for example "ready", "self-test", "error" and "operating run". It is self-evident that other status indications are alternatively or additionally possible.

In the variable area 48 there are in the example of FIG. 4 a total of nine operator control keys 56, with which it is possible to control various further functions of the respective appliance, such as for example an operating time or an operating temperature. Since not all kitchen appliances require for example a temperature setting facility, in individual appliances the corresponding keys 56 may be unassigned or assigned other functions.

The invention claimed is:

1. An aircraft galley comprising:
 a plurality of functionally different electrical kitchen appliances, each kitchen appliance including a main functional part and an operator control unit manufactured structurally separate from the main functional part,
 wherein each of the operator control units has an arrangement of operator control elements for operator control of the appliance defined by all the operator control elements on an operator control side of the operator control unit;
 wherein each operator control unit is capable of controlling all functions of the corresponding main functional part;
 wherein the arrangement of operator control elements on each of the operator control units of the appliances is identical, thereby forming an identical arrangement scheme of the operator control elements on each of the operator control units,
 for at least one operator control element disposed identically from operator control unit to operator control unit, a different or no operator control function is assigned;
 wherein each operator control unit contains a fixed and identical arrangement of mechanical and visual operator control elements; and
 wherein each operator control unit is structurally separate from other operator control units.

2. The aircraft galley of claim 1, wherein for each of the appliances at least one identical operator control function is assigned.

3. The aircraft galley of claim 1, wherein the operator control units each comprise at least one visual display member and wherein each of the operator control units of the appliances includes a mutually identical arrangement scheme of the display members of the operator control units.

4. The aircraft galley of claim 1, wherein each of the operator control units includes an identical construction of an electrical interface arrangement, by which the relevant operator control unit is connected electrically to the main functional part of the respective appliance.

5. The aircraft galley of claim 1, wherein at least one of the operator control elements of each operator control unit is a mechanical operator control element.

6. The aircraft galley of claim 1, wherein at least one of the operator control elements of each operator control unit is formed by a touch-sensitive button.

7. The aircraft galley of claim 1, wherein, for at least one operator control element of two or more operator control units, a same operator control function is assigned, wherein the same operator control function includes at least one of placing a respective appliance in an on, off, or standby state.

* * * * *